3,639,566
VAGINAL SUPPOSITORY CONTAINING LACTO-
BACILLI ACIDOPHILUS DOEDERLEINI
Ryoichi Naito, Ibaragi, Yoshigoro Oguro, Osaka, and
Takuji Doi, Kyoto, Japan, assignors to The Green
Cross Corporation, Osaka, Japan
No Drawing. Filed July 29, 1970, Ser. No. 59,354
Claims priority, application Japan, Jan. 12, 1970,
45/3,666
Int. Cl. A61j 3/08; A61k 9/02; C12k 1/08
U.S. Cl. 424—37
8 Claims

ABSTRACT OF THE DISCLOSURE

Strains of *Lactobacillus acidophilus* Doederleini isolated from healthy young women's vagina had been continuously and successively cultured in culture media containing various kinds of antibiotics to make the strains antibiotics-resistant; the bacilli are cultivated in an adequate liquid culture media under a semi-anaerobic condition; culture media with grown bacilli are mixed with sterilized starch, which is separated from said media; starch with absorbed bacilli is added with dried sterilized starch and sealed in gelatin capsules after addition of estriol.

---

The present invention relates to a vaginal suppository containing the Doederlein's bacillus which can restore the physiological autopurification of vagina.

It has been well known that many lactic bacilli resembling *Lactobacillus acidophilus* inhabit in vagina of healthy adult women, propagate by utilizing glycogen secreted from the vaginal mucous membrane as an energy source, and produce lactic acid therefrom which can keep a vaginal lumen weak acidic, thereby the propagation of other various microorganisms such as bacteria is inhibited and the vaginal lumen is kept clean. The lactic bacillus isolated from vagina is named after the discoverer thereof to be the Doederlein's bacillus and the physiological cleaning effect by the bacillus is called "autopurification."

The presence of glycogen is essential for the propagation of the Doederlein's bacillus and it has been known that the secretion of an estrogenic hormone, estriol (3-$\beta$-16-$\alpha$-3-hydroxy estra 1,3,5,(10) triol) in accordance with the healthy physiological cycle of women is required for the secretion of glycogen in the epithelium of vaginal mucous membrane.

The Doederlein's bacillus cannot grow in babies and infants before puberty and post menopausal old women, because no glycogen is present in the vaginal wall. It is, therefore, also known that vaginitis is often induced in infants by the infection of *Staphylococcus* and *Corynebacterium diphtheriae* and the senile vaginitis, non-specific vaginitis and the prueritus vulvale are subject to occur in old women.

Sulfa drugs, antibiotics and the like have principally been used for the treatment of the diseases and the lactic bacilli containing preparations have partially been used as suppositories.

Particularly, in recent years, in accordance with the development of a variety of antibiotics, the antibiotic preparations have often been given to the patients. The Doederlein's bacillus may perish under the influence of the administration of these antibiotics. It has, therefore, been known that, since the autopurification of the vagina is lost, though the pathogenic bacteria such as Staphylococcus and the like may once perish by the administration of antibiotics, they again invade into the vaginal lumen by some causes, propagate and induce the distresses such as non-specific vaginitis, prueritus vulvale and the like. Further, these pathogenic bacteria have often acquired resistance to the antibiotics and it has become difficult to treat these diseases by the administration of only antibiotics. The conventional suppositories containing lactic bacilli are insufficient in effect to restore the autopurification.

These suppositories are prepared from a combination of dried cells of the Doederlein's bacillus or lactic bacilli with suitable carriers, lactose and the like by tabletting the same by means of a tabletting machine. A large proportion of the cells perish by the physical impact given at the moment of tabletting and they cannot be stored for an extended period of time. Because of the form of tablets, a considerable period of time is necessary before the cells are diffused in the vaginal lumen and begin to propagate. Because of the aforementioned reasons, these suppositories are not preferable as a treating agent of vaginitis. The commercial lactic bacilli-containing suppositories are all sensitive to the antibiotics employed as treating agents for vaginitis and when administered together with antibiotics concomitantly they cannot achieve the original purpose under the influence thereof.

The necessary requisites for the vaginal suppository are summarized as follows:

(1) Sufficient member of the living cells should be contained in the suppository when administered so that lactobacilli can propagate to an enough number in the vaginal lumen in a short period of time.

(2) The suppository should be such a preparation that said bacilli can be dispersed in the vaginal lumen immediately after administration and it should readily be administered.

(3) A substance which can be utilized as an energy source for said bacilli should be present in the vagina and, in particular, an energy source required for the living of said bacillus for an extended period of time should be secured.

(4) Said bacilli should tolerate the simultaneous administration of antibiotics. That is to say, said bacilli should have resistance to the antibiotics used for the treatment of vaginitis.

An object of the present invention is to provide a vaginal suppository containing the Doederlein's bacillus which is a capability of restoring the physiological autopurification of the vagina.

A further object of the present invention is to provide a vaginal suppository having suitable conditions under which the Doederlein's bacillus can restore the autopurification quickly in the vaginal umen when administered.

As the result of an extensive investigation for the suppositories satisfying these aforementioned conditions, we have now discovered that the objects can sufficiently be achieved by the following method.

In the examination of the static charge of the Doederlein's bacillus in the culture medium, we found that it was a negative charge. It could be directly observed microscopically by applying a weak D.C. voltage to liquid culture media. When the electric charge of the particles of diatomaceous earth, clay, starch and the like suspended in water was studied by the same method, we found that starch had the positive charge. Starch useful in the present invention may be of any source, but particularly potato starch or corn starch is preferable. A powder of potato starch or corn starch was dispersed on a dish, placed in a vacuum sterilizer and ethylene oxide gas was passed to displace air and the gas sterilization was effected at 55° C. for 4 hours to prepare a sterilized product. One part by volume thereof was added to 10 parts by volume of liquid culture medium in which the said bacillus had been cultivated for 48 hours and stirred and the mixture was allowed to stand. The starch precipitated to the bottom in a comparatively short period of time because of its greater gravity with adsorbing more than 80% of the bacillus. When a small quantity of the precipitate was applied on a slide glass, dried, stained with a methylene blue and examined under microscope, it was clearly observed that one or several cells of the Doederlein's bacillus were adsorbed on the surface of the starch particles. It is possible to collect the bacillus in a living state by adding starch powder sterilized at a low temperature to the culture broth and the operation is readily applied to a practical manufacturing process. For example, when about 2 parts by volume of potato starch sterilized with gas at a low temperature are placed in 10 parts by volume of the culture broth, agitated and allowed to stand to precipitate the starch, about 80% of the cultivated bacilli are adsorbed onto the starch. When the solution from which the precipitate has been removed is poured into one part by volume of starch spreaded on a filter paper to filter the solution and, at the same time, to adsorb the bacilli on the starch spreaded over the filter paper, about 100% of the bacilli can be collected in a living state.

The thus obtained starch contains a large volume of water and presents a muddy state, however, when on part by volume of fresh starch is added thereto and mixed with stirring, the starch dust which appears to be dry is obtained. But, it contains such amount of water that it loses a weight of as much as 40% when placed in a desiccator over anhydrous phosphoric acid under a reduced pressure for seven days. When the starch powder on which the Doederlein's bacillus have been adsorbed is placed aseptically in sterilized small test tubes by each one gram, kept at a temperature of 25° C., cultivated after some intervals and number of the living Doederlein's bacillus is examined by calculating the number of the cultivated colonies, the number of the Doederlein's bacillus increases about two-folds in a week, and remains almost constant for the next about 25 weeks and then gradually decreases to about one-half of the original number after 50 weeks. Well, it has been known that when a culture broth of the bacillus is maintained at a temperature of 25° C. reduction of the number of the living bacilli to one-half in a week is inevitable because of the metabolic substances produced by the life of the bacilli and therefore the aforementioned long life is an unexpectedly preferable effect. The causes thereof may be that partly, acids produced by the Doederlein's bacillus and other metabolic substances are absorbed into the starch particles and the substances harmful to the life of the bacilli are removed from around the bacilli, and partly the starch is a nutritional source for the Doederlein's bacillus. As a proof for the presumption, 1 part by weight of starch was suspended in 100 parts by weight of water and heated to 121° C. for 30 minutes to convert to a weak paste, in which the bacilli were then cultivated and the number of the living bacilli was examined at intervals of time. It was proved that this number increased two-fold during the first 24 hours. It was also proved that when 1 part by weight of starch powder was mixed with stirring with 3 parts by weight of 0.01 N diluted lactic acid solution and starch was precipitated, the amount of lactic acid in the supernatant was decreased markedly.

The starch powder in which said cultivated Doederlein's bacillus have been adsorbed allows a long life of the Doederlein's bacillus and enables to expect a sufficient effect from the number of the living bacilli, however, in order to satisfy the aforesaid requirement (2) the preparation must have a form which is convenient in inserting deeply into the vaginal lumen and which allows to liberate the bacilli into the vaginal lumen immediately after insertion. However, there are such defects, that not only the tabletting process is difficult because of large water contents of the Doederlein's bacillus-adsorbed starch, but also when the water content is reduced forcibly to form a tablet with addition of carriers such as lactose, over 70% of the Doederlein's bacillus is killed by an instantaneous high temperature produced within a tablet by a mechanical impact strength. In order to avoid the loss of the living bacilli caused by the tabletting process and to form a preparation which allows to liberate the bacilli immediately after insertion, we adopted a method of charging the wet starch with adsorbed Doederlein's bacillus into a gelatin capsule under a mild condition. We have found that the usual hard gelatin capsule is dissolved in moist vaginal lumen at a temperature of around 37° C. within 2 minutes and liberates the contents. The Doederlein's bacillus can, therefore, be diffused into the vaginal lumen together with starch in a short period of time after insertion and can propagate immediately.

Thus, administered Doederlein's bacillus can temporarily propagate by utilizing a variety of energy sources involved in the starch, however, in order to inhabit in the vaginal lumen for the bacillus for an extended period of time, it is necessary that glycogen is produced in the epithelium of the vaginal mucous membrane. It is essential for that purpose that the patients themselves secrete the estrogenic hormone, estriol. Since it is known that, when administered in vaginal locally estriol is readily absorbed and transported into the circulation and secreted through the submucous membrane of the vagina to the epithelium of the vagina, the object can readily be achieved by adding estriol to a mixed powder of said Doederlein's bacillus and starch. It has already been confirmed that intravaginally administered estriol is absorbed and transported to the circulation as evidenced by literature such as Merrill, R. C.: Physiol. Rev. vol. 38, pp. 463 to 480, 1958; Gitsch, E.: Geburt. Frauenklinik, vol. 20, pp. 1052 to 1059, 1960; Kushima: San-Fujinka no Sekai (World of the Gynecol. & Obstet.): vol. 14, pp. 855 to 858, 1962 and the like. As an ordinary dosage of estriol 0.4 to 0.6 mg. per capsule is sufficient.

As mentioned previously, antibiotics such as chloramphenical, tetracycline and the like are frequently given in the gynecological diseases for the purpose of inhibiting the propagation of Staphylococcus and the like, and these antibiotics inhibit the growth of the Doederlein's bacillus in the vaginal lumen, too, to convert the vaginal lumen into a desert and thereafter allow the intravaginal propagation of Staphylococcus, Candidae and the like resistant to said antibiotics. It is desirable, therefore, in the supply of the vagina autopurifying Doederlein's bacillus in accordance with the present invention that the bacilli themselves have resistance to said antibiotics. As a method of obtaining a strain of said bacillus resistant to said antibiotics, for example, an agar plate culture medium containing 2% of glucose, 10% of raw tomato juice, 1.5% of peptone for bacterial cultivation, 1.5% of agar and having a pH value of of 6.6 is prepared. A vaginal secrete from young, healthy women is applied thereto, and it is kept at 37° C. for 48 hours to obtain a pure culture from many single colonies which have grown on the surface of the medium, from which a bacterial strain corresponding to the Doederlein's bacillus in the properties reported in the literature is isolated from the result of the general bacteriological examination, and for acquiring resistance to said antibiotics a successive cultivation of the isolated strain is continued on a medium added with a variety of antibiotic preparations to obtain a strain having a desired resistance. The amounts of a variety of antibiotics to be added in the successive cultivation are gradually increased and finally those cultivated in a culture medium containing the following amounts of the antibiotics are used.

Penicillin G potassium salt—250 units/ml.
Streptomycin—15,000 γ/ml.
Tetracycline—125 γ/ml.
Oxytetracycline—100 γ/ml.
Oleandomycin—3,000 γ/ml.
Polymixin B—3,000 γ/ml.
Chloramphenical—100 γ/ml.
Kanamycin—300 γ/ml.

Fradiomycin—1,000 γ/ml.
Colistin—500 units/ml.
Erythromycin—1,000 γ/ml.

In this case, strains of the bacillus isolated from several young women are cultivated successively on a culture medium containing antibiotics, respectively, to acquire the resistance to said antibiotics, and said strains are cultivated, respectively, and starch is added to the resulting fermentation broth and treated as previously to obtain starch dust which absorbed the bacillus, respectively. The respective thus-obtained starch dusts can be used in admixture. In general, preferable results are observed when a mixture of two to five thus obtained respective starch dusts are used.

The composition of the suppository of the present invention is as follows and the ordinary therapeutic dosage is from 1 to 2 capsules daily.

The number of the cells of said bacilli contained in each gram of the starch should be at least $10^5$ to $10^7$ cells and the number of the cells may suitably be adjusted by adding starch free from the cells.

|  | Mg./capsule |
|---|---|
| Starch which absorbed the bacillus | 100–150 |
| Estriol | 0.4–0.6 |
| Starch free from the bacillus | 350–400 |
| Total | ca. 500 |

The present invention is explained by reference to an example hereinbelow.

An agar plate medium containing 2% of glucose, 10% of raw tomato juice, and 1.5% of peptone for the bacterial cultivation and having the pH value of 6.6 was prepared. The vaginal secretes from 6 healthy, relatively young women were applied to the surface thereof and cultivated, respectively. Many pure cultivation strains were collected from each colony and forms and biological properties thereof were examined according to the general bacteriological method of examination, and identified by the comparison to the properties of the Doederlein's bacillus described in the literature references 10 strains of said bacillus were isolated, cultivated successively on the medium added with a variety of antibiotics and 5 strains which have acquired resistance to the antibiotics were selected out. Each of the strains was cultivated in a culture broth containing 2.5% of peptone and 0.3% of lactose and having the pH value of 6.3 to 6.8 at a temperature of 37° C. for 48 hours, respectively. To each culture broth was added with stirring potato starch sterilized at a low temperature with ethylene oxide, and starch was precipitated. The supernatant was filtered on a sterilized filter-paper on which starch had been spread and both said starch and starch which absorbed the bacillus were collected. A sterilized starch free from the bacillus was added thereto so as to produce a body of starch dust which appeared to be dry. All these starch dusts are mixed well. In this case, the number of the living cells in the culture broth was examined simultaneously using the cultivation method and the amount of the starch to be added was adjusted so that the number of the living cells in one gram of the starch powder was between $10^5$ and $10^7$. The starch powder was placed in a sterilized rotating vessel to admix completely theerin and the mixture was divided in small portions and charged into gelatin capsules, and furthermore 0.5 mg. of estriol was added to each capsule and then the capsules were sealed.

Gelatine of the capsules was assured to decompose by water and the temperature of the vaginal lumen within 2 minutes and the preparation liberated the contents and brought the vaginal lumen to the acidity by the propagation of the living cells like in healthy women.

As the results of trials in 214 female patients in many clinics, it was confirmed that the preparation in accordance with the present invention had a therapeutical effect in over 80% of the cases of non-specific vaginitis, senile vaginitis, trichomonas vaginitis, vaginal mycosis, intravervical and vulval pruritis.

What we claim is:

1. A suppository for treating vaginitis which comprises a gelatin capsule containing estriol and living Doederlein's bacillus adsorbed on a sterilized starch.

2. A suppository for treating vaginitis according to claim 1, wherein there are adsorbed at least $10^5$ to $10^7$ cells of said bacillus per gram of the starch.

3. A suppository for treating vaginitis according to claim 1, wherein estriol is contained at the rate of 0.4 to 0.6 mg. per each capsule.

4. A suppository for treating to vaginitis according to claim 1, wherein said starch is corn starch or potato starch.

5. A suppository for treating to vaginitis according to claim 1, wherein said starch is a mixture of two to five starch dusts which are obtained from different culture broths.

6. A process for treatment of vaginitis which comprises intravaginally administering a suppository to an afflicted female comprising a gelatin capsule containing therein living Doederlein's bacillus absorbed on a sterilized starch, said starch absorbs at least $10^5$ to $10^7$ cells of said bacillus per gram, and estriol in an amount within the range from 0.4 to 0.6 mg. per capsule.

7. A method of producing a vaginal suppository containing *Lactobacilli acidophilus* Doederleini which comprises culturing and propagating said bacillus highly resistant to antibiotics in a liquid culture medium, adding previously sterilized starch to the bacillus culture suspension obtained so as to absorb the bacillus on the starch, further adding dry starch to the bacillus absorbed starch until the mixture has the appearance of dry starch powder and charging the resulting mixture together with estriol into a gelatin capsule.

8. A method of producing a vaginal suppository containing *Lactobacilli acidophilus* Doederleini according to claim 7, wherein a previously sterilized starch is added to said resulting mixture so that there are contained $10^5$ to $10^7$ cells of the bacillus per gram of the resultant.

References Cited
UNITED STATES PATENTS

| 3,072,528 | 1/1963 | Kludas et al. | 424—93 X |
| 3,262,864 | 7/1966 | Kouchner | 424—93 X |
| 3,320,130 | 5/1967 | Henry | 424—93 |
| 3,369,969 | 2/1968 | Nouvel | 424—93 |

SHEP K. ROSE, Primary Examiner

U.S. Cl. X.R.

128—271; 424—14, 16, 93, 240